Figure 1:
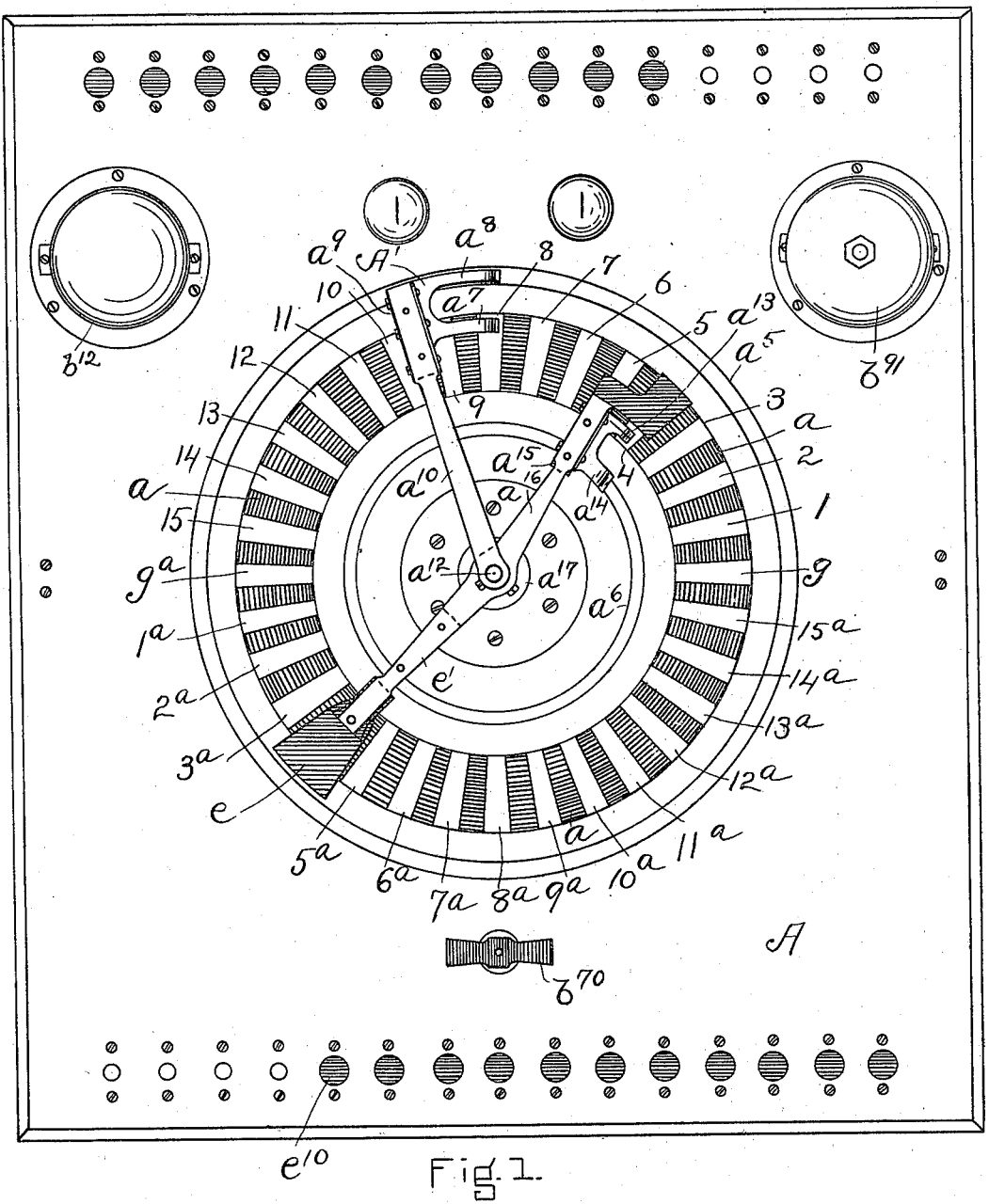

(No Model.) 3 Sheets—Sheet 1.

E. & F. W. HEYMANN
TESTING APPARATUS FOR ELECTRIC CIRCUITS.

No. 598,517. Patented Feb. 8, 1898.

WITNESSES.
Matthew M. Blunt
J. Murphy

INVENTORS.
Edward Heymann
Frank W. Heymann
by Jas. H. Churchill
ATT'Y (No Model.) 3 Sheets—Sheet 2.
E. & F. W. HEYMANN
TESTING APPARATUS FOR ELECTRIC CIRCUITS.
No. 598,517. Patented Feb. 8, 1898.
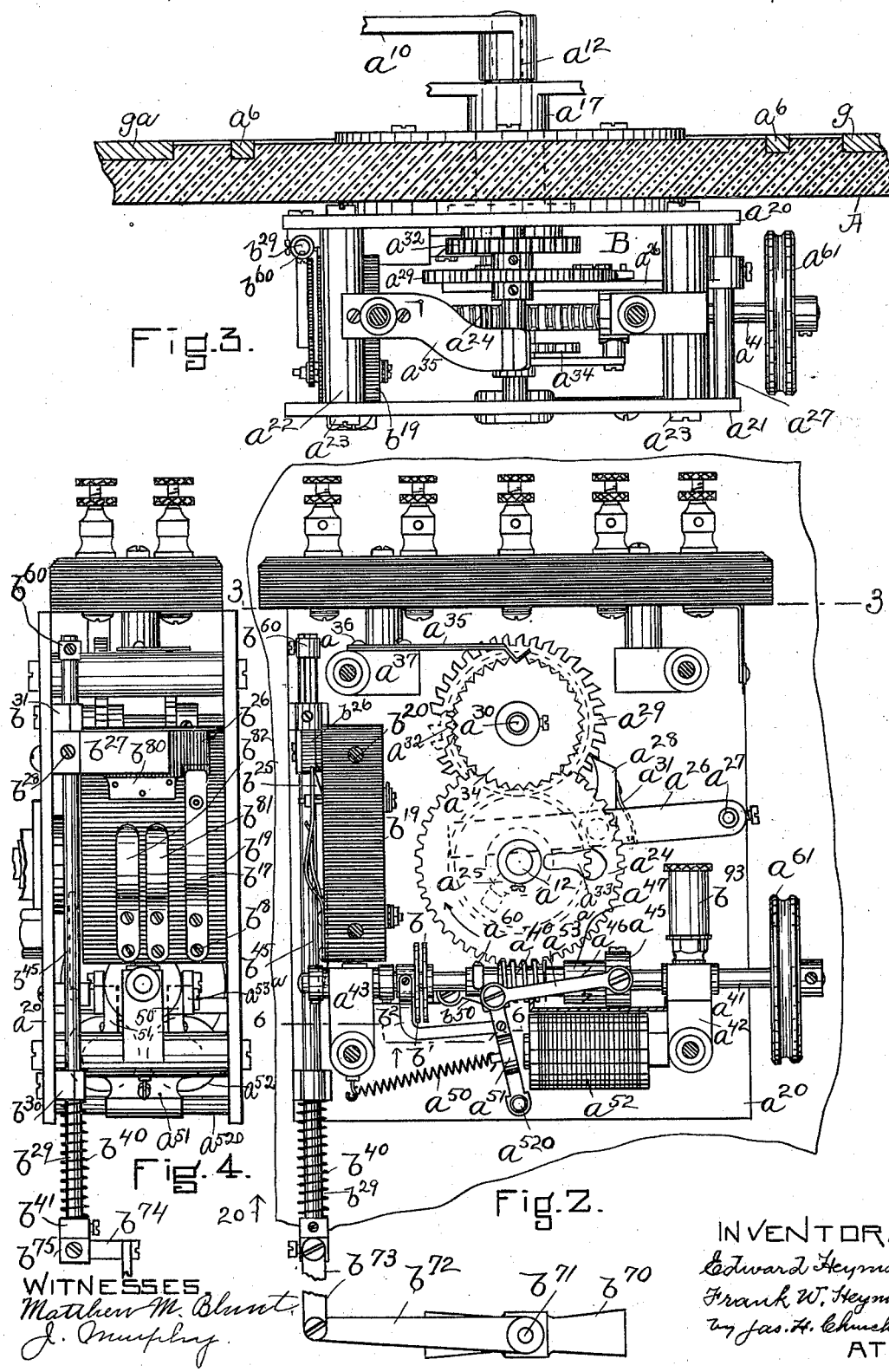
WITNESSES
Matthew M. Blunt
J. Murphy
INVENTORS.
Edward Heymann
Frank W. Heymann
By Jas. H. Churchill
ATT'Y

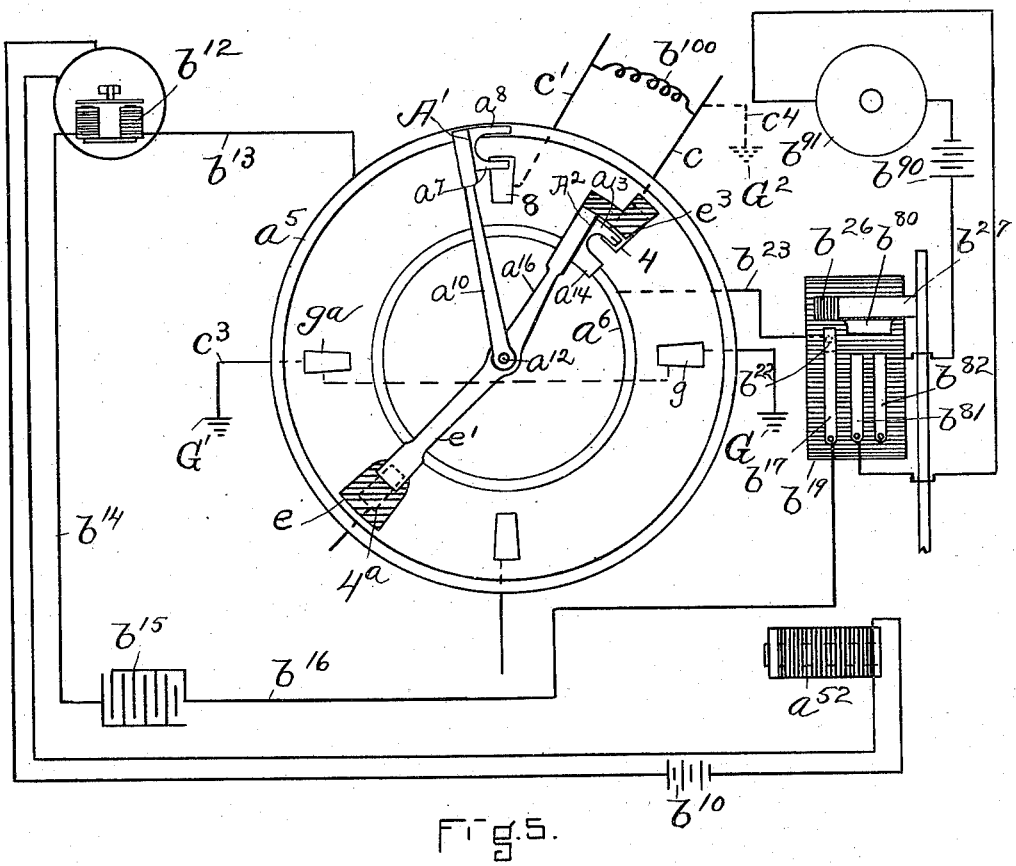

UNITED STATES PATENT OFFICE.

EDWARD HEYMANN AND FRANK W. HEYMANN, OF BOSTON, MASSACHUSETTS.

TESTING APPARATUS FOR ELECTRIC CIRCUITS.

SPECIFICATION forming part of Letters Patent No. 598,517, dated February 8, 1898.

Application filed February 26, 1897. Serial No. 625,166. (No model.)

*To all whom it may concern:*

Be it known that we, EDWARD HEYMANN and FRANK W. HEYMANN, residing at Boston, in the county of Suffolk and State of Massachusetts, have invented an Improvement in Testing Apparatus for Electric Circuits, of which the following description, in connection with the accompanying drawings, is a specification, like letters and figures on the drawings representing like parts.

This invention relates to an apparatus for testing electric circuits for cross connections or grounds, and is especially designed and adapted for testing electric systems employing a multiplicity of circuits—such, for instance, as telephone, police or fire signals, electric light, and other electric systems.

In accordance with this invention the circuits of the system are connected in a central office or other station to a series of terminals preferably arranged in a circle upon a suitable base or support and separated from each other by suitable insulation. The line-wires or sides of each circuit are connected, preferably, to substantially diametrically opposite terminals and with the terminals of all the circuits coöperate movable circuit-controllers having different rates of movement, one of the said circuit-controllers preferably making a complete cycle and passing over all the circuit-terminals, while the other movable circuit-controller passes from one terminal to the next adjacent terminal. The two movable circuit-controllers bear the same relation to each other as the hands of a watch, although it will be understood that the rate of movement of the said circuit-controllers is not necessarily the same as the minute and hour hands of a watch. The movable circuit-controllers also coöperate with stationary terminals of an auxiliary circuit or loop of a circuit which is adapted to be included into or connected with the particular circuit being tested, and the said auxiliary or loop circuit includes in it an electromagnet which preferably governs or controls the movements of the movable circuit-controllers, preferably in a manner as will be described, and arrests or stops the said movable circuit-controllers on the circuit-terminals, forming part of the crossed or grounded circuits, thereby locating the trouble on the outside lines and individualizing the particular sides or side of the circuits which are crossed or grounded, as will be more fully described hereinafter.

The apparatus is adapted for testing both high and low potential circuits; but when used with high-potential circuits we prefer to employ a relay and a condenser in the loop or auxiliary circuit and to locate the electromagnet controlling the movement of the circuit-controllers in a local circuit controlled by the said relay. When used with low-potential circuits, the relay and condenser may be omitted. The loop or auxiliary circuit may and preferably will include a circuit-controller which is normally closed, but is adapted to be opened, for a purpose as will be described, when the electromagnet governing the movable circuit-controllers is operated. The apparatus also preferably includes a circuit-controller governing an alarm, preferably an audible signal, by which the attention of the operator may be called to the crossing or ground detected. These and other features of this invention will be pointed out in the claims at the end of this specification.

Figure 1 is a front elevation of a testing apparatus embodying this invention; Fig. 2, a rear elevation, with parts broken away, of the operating mechanism for the movable circuit-controllers, the rear supporting-plate for the operating parts being omitted; Fig. 3, a sectional plan view of the apparatus shown in Fig. 2, the section being taken on the line 3 3, Fig. 2; Fig. 4, a side elevation of the parts shown in Fig. 2, looking toward the right; Fig. 5, a diagrammatic view, to be referred to; and Fig. 6 a sectional detail, to be referred to, taken on the line 6 6, Fig. 2.

In the present embodiment of this invention the circuit-terminals to which are connected the lines or circuits to be tested are arranged in a circle, and the movable circuit-controllers are revolved about the center of the said circle. Each circuit is provided with two terminals, preferally arranged substantially diametrically opposite, and for convenience these terminals are designated "positive" and "negative" terminals.

Referring to Fig. 1, the positive terminals are numbered from 1 to 15, inclusive, and the negative terminals from $1^a$ to $15^a$, inclusive. These terminals may be of any suitable construction, but preferably pieces of metal separated by pieces $a$ of insulation, which latter may form part of a support, preferably a slab A, of slate, rubber, or other suitable insulating material. The positive and negative terminals are separated in the present instance by two terminals $g$ $g^a$ for a purpose as will be described.

The circuit-terminals referred to have cooperating with them two terminals $a^5$ $a^6$, preferably metal rings, secured to the plate or support A outside of and within the circle of line-terminals, as shown in Figs. 1 and 5. The terminal rings $a^5$ $a^6$ may be designated "local" terminals to distinguish them from the line-terminals.

The local terminals $a^5$ $a^6$ are adapted to be electrically connected with the line-terminals by means of movable circuit-controllers A' A², preferably made as herein shown, the member A' consisting of metal or conducting fingers or brushes $a^7$ $a^8$, electrically connected together and herein shown as secured to an insulating piece or block $a^9$, fastened to an arm $a^{10}$, which is fast on a shaft or arbor $a^{12}$ of a motor mechanism B. (See Fig. 3.) The movable controller A² is shown of similar construction, and consists of electrically-connected metal fingers or brushes $a^{13}$ $a^{14}$, fastened to an insulating-block $a^{15}$, secured to an arm $a^{16}$, fast on a sleeve $a^{17}$, forming part of the motor mechanism B, as will be described. The finger or brush $a^7$ of the movable controller A' is adapted to make contact with the line-terminals 1 to 15 and $1^a$ to $15^a$, and the finger or brush $a^8$ makes contact with the local terminal or ring $a^5$. The finger or brush $a^{13}$ of the controller A² is adapted to make contact with the line-terminals, and the finger or brush $a^{14}$ makes contact with the local terminal or ring $a^6$.

The movable circuit-controllers A' A² are designed to have different rates of movement, and in the present instance the movable controller A' may be supposed to make one complete revolution and thereby make contact with all the line-terminals while the movable controller A² is moved from one line-terminal to the next adjacent line-terminal, which movements, as above referred to, are similar to the relative movements of the hands of a watch.

The motor mechanism B, which drives or moves the movable controllers A' A², may and preferably will be made as herein shown, and consists of the shaft $a^{12}$, having bearings in a framework shown as composed of two plates $a^{20}$ $a^{21}$, (see Fig. 3,) separated by posts or standards $a^{22}$, to which the said plates are fastened, as by screws $a^{23}$.

The shaft $a^{12}$ has fast on it a worm gear-wheel $a^{24}$, (see Figs. 2 and 3,) provided on one face with a lug or projection $a^{25}$, (see dotted lines, Fig. 2,) which projection is adapted in the revolution of the worm-gear $a^{24}$ to engage a pawl-carrying lever $a^{26}$, mounted upon a pivot shaft or pin $a^{27}$, having bearings in the frame-plates $a^{20}$ $a^{21}$. The pawl-carrying lever has pivoted to it a push-pawl $a^{28}$, which is adapted to engage a ratchet-wheel $a^{29}$, fast on a shaft $a^{30}$, having bearings in the plates $a^{20}$ $a^{21}$, the said pawl being kept in engagement with the teeth of the ratchet-wheel by a spring $a^{31}$. The ratchet-wheel $a^{29}$ is provided with as many teeth as there are individual line-terminals on the plate A. The shaft $a^{30}$ has fast on it a gear-wheel $a^{32}$, which meshes with a gear-wheel $a^{33}$, fast on the sleeve $a^{17}$, which latter is loosely mounted on the shaft $a^{12}$. The gear-wheels $a^{32}$ $a^{33}$ are provided with a like number of teeth, which is equal to the number of teeth on the ratchet-wheel $a^{29}$. The shaft $a^{30}$ has also fast upon it a star-wheel $a^{34}$, (see Fig. 2,) with which engages a holding-spring $a^{35}$, secured, as by screws $a^{36}$, to a lug or projection $a^{37}$ on one of the standards or posts $a^{22}$. The worm gear-wheel $a^{24}$ is adapted to be rotated by means of a worm $a^{40}$, loose on a shaft $a^{41}$, having bearings in suitable lugs or projections $a^{42}$ $a^{43}$, extended from two of the standards or posts $a^{22}$, as clearly shown in Fig. 2. The worm $a^{40}$ is adapted to be rendered fast on the shaft $a^{41}$ by means of a clutch mechanism, which may be of any usual or suitable construction, but which is herein shown as a hub $a^{45}$, keyed on the shaft $a^{41}$ to move thereon longitudinally, and provided with teeth $a^{46}$, which are adapted to be engaged with corresponding teeth on a collar or hub $a^{47}$, secured to or forming part of the worm $a^{40}$. The hub $a^{47}$ constitutes the stationary member of the clutch and the hub $a^{45}$ constitutes the movable member of the clutch. The movable member $a^{45}$ of the clutch is adapted to be moved in one direction to engage it with the stationary member $a^{47}$ by a spring $a^{50}$, (see Fig. 2,) having one end attached to a stationary part of the frame and its other end attached to the armature $a^{51}$ of an electromagnet $a^{52}$, which may be designated the "clutch-operating" electromagnet. The armature $a^{51}$ is fast on a shaft or pivot-pin $a^{520}$, having bearings in the frame-plates $a^{20}$ $a^{21}$, and the said armature is provided at its opposite ends with forks or arms 50 51, (see Fig. 6,) joined by connecting-rods $a^{53}$ $a^{53a}$ with the opposite sides of the movable clutch member $a^{45}$. The worm $a^{40}$ is secured on the shaft against longitudinal movement, as herein shown, by means of a screw $a^{60}$, extended through the worm-sleeve and into an annular groove in the shaft $a^{41}$ and not herein shown.

The worm-shaft $a^{41}$ may be driven in any suitable or desired manner, and in the present instance the said worm-shaft is provided with a pulley $a^{61}$, which in practice is connected by a suitable belt to a main or driving shaft not herein shown. In the normal position of the clutch mechanism the movable member $a^{45}$ is engaged with the stationary member $a^{46}$, and the worm $a^{40}$ is locked to the worm-shaft $a^{41}$, so that when the worm-shaft $a^{41}$ is being revolved the worm-gear $a^{24}$ will be rotated and the movable circuit-controllers $A'$ $A^2$ will be continuously carried over the line-terminals and the local terminals shown in Fig. 1. When the electromagnet $a^{52}$ is energized, as will be specifically hereinafter set forth, the armature $a^{51}$ will be attracted and the clutch member $a^{45}$ will be disengaged from the clutch member attached to the worm, and in order that the worm-shaft may be stopped substantially in an instant a brake mechanism is provided, which may and preferably will be of the construction herein shown and as will now be described.

Referring to Figs. 2 and 6, the worm-shaft $a^{41}$ has fast on it a disk $b$, with which coöperates a like disk $b'$, loose on the worm-shaft and adapted to be moved into engagement with the disk $b$ by an intermediate connection between the disk $b'$ and the armature $a^{51}$ of the electromagnet $a^{52}$. The intermediate connection referred to consists, as herein shown, of a link or rod $b^2$, (see Fig. 6,) provided with forks or arms $b^3$ $b^4$, which are pivotally connected to the forked arms 50 51 of the armature $a^{51}$.

The link $b^2$ is pivotally connected to the hub of the disk $b'$ in any suitable manner. By reference to Figs. 2 and 6 it will be seen that when the armature $a^{51}$ is attracted by the magnet $a^{52}$ the movable disk $b'$ will be brought into engagement with the disk $b$ and thereby create sufficient friction to stop the rotation of the shaft $a^{41}$ substantially in an instant. The clutch-magnet $a^{52}$ may and preferably will be included in a local circuit provided with a local battery $b^{10}$, (see Fig. 5,) which local circuit is under the control of a relay $b^{12}$, of any usual or suitable construction, but preferably that shown and described in our United States Patent No. 427,571, dated May 13, 1890, the said relay having one end of its coil connected by the wire $b^{13}$ to the local terminal ring $a^5$ and the other end of its coil connected by a wire $b^{14}$ to one side or plate of the condenser $b^{15}$, which may be of any usual or suitable construction, the said condenser having its opposite plate or side connected by the wire $b^{16}$ to a contact brush or pen $b^{17}$, constituting the movable member of a circuit-controller for the branch or loop, or, as we prefer to term it, the "auxiliary" circuit, including the relay, the contact-pen $b^{17}$ being fastened, as by screws $b^{18}$, (see Fig. 4,) to a block or support $b^{19}$, of insulating material, which block or support is fastened in any suitable manner, as by pins or screws $b^{20}$, to the frame-plates $a^{20}$ $a^{21}$.

The insulating-block $b^{19}$ supports the stationary member of the local circuit-controller referred to, which stationary member may be a pin $b^{22}$, extended through the block or support $b^{19}$ and connected by wire $b^{23}$ with the local terminal ring $a^6$. The contact-spring $b^{17}$ is preferably provided on its under side with a wedge or inclined surface $b^{25}$, (see Fig. 2,) with which is adapted to coöperate a piece $b^{26}$ of insulating material attached to a metallic arm $b^{27}$, (see Fig. 4,) fastened, as by screw $b^{28}$, to a movable rod $b^{29}$, the said rod being movable in suitable bearings $b^{30}$ $b^{31}$, secured to the frame-plate $a^{20}$. The insulating-arm $b^{26}$ is adapted to be brought under the spring $b^{17}$ to lift the same from engagement with its coöperating contact $b^{22}$ and thereby open the circuit of the relay $b^{12}$, as will be more fully described. This movement of the insulating-piece or, as it may be termed, the "separator" is effected, as herein shown, by means of a coiled spring $b^{40}$, encircling the rod $b^{29}$ between the bearing $b^{30}$ and a collar $b^{41}$, fast on the said rod. Normally the spring $b^{40}$ is compressed and the insulating-piece $b^{26}$ is withdrawn from engagement with the terminal spring $b^{17}$. The insulating-piece $b^{26}$ and the rod $b^{29}$ are held in their normal position until released, as will be described, by a locking device operatively connected to the armature $a^{51}$ of the electromagnet $a^{52}$. The locking device referred to may and preferably will be made as herein shown, and consists of a bolt or sliding rod $b^{43}$, (see Fig. 6,) movable in a suitable guide $b^{44}$, attached to the plate $a^{20}$ and adapted to engage a feather or projection $b^{45}$, secured to or forming part of the rod $b^{29}$, the feather or projection being shown by dotted lines in Figs. 4 and 6 and by full lines in Fig. 2. The locking-bolt $b^{43}$ is adapted to be withdrawn from engagement with the feather or projection $b^{45}$ by the armature $a^{51}$, to the fork $b^{51}$ of which the said locking-bolt is connected by the link or rod $b^{50}$. (See Figs. 2 and 6.) The feather or projection $b^{45}$ is made of such length as to remain in engagement with the locking-bolt $b^{43}$ when the rod $b^{29}$ has been moved to the limit of its travel by its spring $b^{40}$, which limit of movement is determined, as herein shown, by a collar $b^{60}$, (see Figs. 2 and 4,) engaging the bearing $b^{31}$. The feather or projection $b^{45}$ serves to prevent the armature $a^{51}$ being retracted by its spring $a^{50}$ when the circuit of the relay is opened by the separator $b^{26}$, and consequently the feather or projection $b^{45}$ serves to keep the member $a^{45}$ of the clutch disengaged from the member $a^{46}$, and thereby insures the circuit-controlling members $A'$ $A^2$ remaining stopped on the proper circuit-terminals until the rod $b^{29}$ has been positively restored to its normal position.

The feather or projection $b^{45}$ constitutes, therefore, a locking device for the clutch member $a^{45}$ in its open position. The rod $b^{29}$ may and preferably will be restored to its normal position by means of the handle or key $b^{70}$, (see Fig. 1,) located in front of the supporting-plate A and mounted on a shaft $b^{71}$, extended through and having bearings in the plate A and provided at the rear of said plate with a crank or arm $b^{72}$, connected by a link $b^{73}$ to a stud or projection $b^{74}$ (see Fig. 4) on a collar $b^{75}$, fast on the rod $b^{29}$. When the handle $b^{70}$ is turned so as to move the rod $b^{29}$ in the direction indicated by the arrow 20, Fig. 2, against the action of the spring $b^{40}$, the spring $a^{50}$, attached to the armature $a^{51}$ of the electromagnet $a^{52}$, becomes active as soon as the feather or projection $b^{45}$ is carried beyond the path of movement of the locking-bolt $b^{43}$. The insulating-piece $b^{26}$, attached to the rod $b^{29}$, has secured to it, as herein shown, a metal bar $b^{80}$, which coöperates with terminal springs $b^{81}$ $b^{82}$, attached to the insulating-block $b^{19}$. The springs $b^{81}$ $b^{82}$ form the terminals of a local circuit containing a local battery $b^{90}$, (see Fig. 5,) in which is included an audible alarm, (represented as a gong $b^{91}$,) and this local circuit is closed when the contact member $b^{80}$ is brought into engagement with the terminal pens $b^{81}$ $b^{82}$. In Fig. 2, $b^{93}$ represents an oil-cup by which the worm-shaft $a^{41}$ may be lubricated. In practice the positive and negative line-terminals 1 to 15 and $1^a$ to $15^a$, inclusive, have connected to them the opposite sides of fifteen independent circuits, and in addition thereto the terminals $g$ $g^a$ are connected, respectively, to the ground G G', as represented in Fig. 5. By reference to Fig. 1 it will be seen that the circuit-controller A' makes a complete cycle of movements and is brought into engagement with all of the line-terminals, including the ground-terminals, during each revolution of the shaft $a^{12}$ and that the movable controller $A^2$ is moved but a part of a revolution for every revolution of the controller A'.

In order that the invention may be clearly comprehended, let it be supposed that the positive wire of one circuit and the positive wire of another circuit are crossed—that is, electrically connected by an outside and foreign wire $b^{100}$. (Shown in Fig. 5.) In this case, as soon as the movable controller $A^2$ comes in contact with the terminal 4, to which the positive wire $c$ is connected, and the movable controller A' comes in contact with the terminal 8, to which the positive wire $c'$ is connected, the circuit of the relay $b^{12}$ will be established and the clutch-operating magnet $a^{52}$ will be energized, thereby operating the apparatus, as heretofore described, to stop the circuit-controllers A' $A^2$ on the terminals 4 and 8. In this case the circuit from the positive wire $c$ back to the positive wire $c'$ may be traced as follows: from the positive wire $c$ to the line-terminal 4, thence by the arms or brushes $a^{13}$ $a^{14}$ to the terminal ring $a^6$, thence by the wire $b^{23}$, contact $b^{22}$, terminal $b^{17}$, wire $b^{16}$ to the condenser $b^{15}$, through the condenser $b^{15}$, thence by wire $b^{14}$ to the relay $b^{12}$, through the relay and by wire $b^{13}$ to the terminal ring $a^5$, thence by the brushes or contact members $a^8$ $a^7$ to the terminal 8, thence by the wire $c'$ and cross-wire $b^{100}$. The current passing over the circuit described will energize the relay $b^{12}$, which in turn will close the local circuit of the battery $b^{10}$, including the clutch-operating magnet $a^{52}$. The clutch-operating magnet $a^{52}$ when energized attracts the armature $a^{51}$, thereby disengaging the clutch member $a^{45}$ from the clutch member $a^{46}$, and at the same time engaging the brake mechanism or disk $b'$ with the disk $b$ on the worm-shaft, and also withdrawing the locking-bolt $b^{43}$ from engagement with the feather $b^{45}$, which permits the spring $b^{40}$ to move the rod $b^{29}$, as previously described, and bring the separator $b^{26}$ into engagement with the terminal spring $b^{17}$, and thereby open the circuit of the relay and at the same time bring the contact member $b^{80}$ into engagement with the springs $b^{81}$ $b^{82}$ and close the local circuit of the alarm or bell $b^{91}$. The audible alarm gives notice to the attendant or operator that a fault has occurred upon the circuits and at the same time locates or designates the particular wires which are crossed.

The apparatus is equally efficient for locating grounds on either the positive or negative wires of the individual circuits, and to illustrate let it be supposed that the movable member A' is in contact with the ground-terminal $g^a$ and that the movable member $A^2$ is in contact with the line-terminal 4 and that a ground $G^2$ exists on the positive wire $c$. In this case the circuit through the relay may be traced as follows: from the positive wire $c$ to the line-terminal 4, thence to the ring $a^6$ through the controller $A^2$, thence by the wire $b^{23}$, relay circuit-controller $b^{17}$, thence by wire $b^{16}$ to the condenser $b^{15}$, thence by wire $b^{14}$, through the relay $b^{12}$, to the terminal ring $a^5$, thence by the movable controller A' to the ground-terminal $g^a$, thence by the wire $c^3$ to the ground G', thence to the ground $G^2$, and from the ground $G^2$, by the wire $c^4$, to the positive wire $c$. The clutch-magnet $a^{52}$ is energized, as previously described, and operates the apparatus to stop with the movable controllers A' $A^2$ in the position just indicated.

In order to avoid completing the auxiliary circuit containing the relay by connecting the two opposite sides of any line-circuit, a shield or guard $e$, of insulating material, is attached to the arm $e'$, forming practically a continuation of the arm $a^{16}$, carrying the movable controller $A^2$. The shield or guard $e$ is made of suitable size and shape to cover the negative terminal of any line when the brush $a^{13}$ of the movable controller $A^2$ is in contact with the positive terminal of the said line-circuit. If the negative terminal were not guarded, which negative terminal may be supposed to be $4^a$ in the present instance, it will be seen that the brush $a^7$ of the movable controller A' in its rotation would make contact with the negative terminal $4^a$ and thereby complete the relay-circuit, and consequently energize the clutch-magnet when no cross or ground existed. This may be illustrated by tracing the circuit with the movable controller A' in contact with the terminal $4^a$. The circuit in this case would be as follows: from the positive wire $c$ to the terminal 4, thence by the brushes $a^{13}$ $a^{14}$ to the ring $a^6$, thence by the wire $b^{23}$, relay-controllers $b^{22}$ $b^{17}$, wire $b^{16}$, condenser $b^{15}$, wire $b^{14}$, to the relay $b^{12}$, through the said relay, thence by the wire $b^{13}$ to the ring or terminal $a^5$, thence by the brushes $a^8$ $a^7$ to the negative terminal $4^a$. The shield or guard $e$ prevents the brush $a^7$ of the movable controller A' making contact with the negative terminal of the particular line-circuit with whose positive terminal the brush $a^{13}$ of the movable controller A² is in contact. During the rotation of the movable controller A' it passes by the movable controller A², and in order to prevent the brush $a^7$ of the movable controller A' from making contact with the positive terminal of the line with which the brush $a^{13}$ of the movable controller A² is in contact a second shield or guard $e^3$, of insulating material, is attached to the arm $a^{16}$, carrying the movable controller A², and is so shaped as to cover the portion of the terminal with which the brush $a^7$ would otherwise make contact, and yet not cover the next adjacent terminal, as clearly represented in Figs. 1 and 5.

If the line-terminal with which the controller A² is in contact was not covered, the circuit of the relay $b^{12}$ would be completed by contact of the brush $a^7$ with the line-terminal with which the brush $a^{13}$ is in engagement. We prefer to employ the condenser and the relay when the circuits to be tested are carrying currents of high potential; but on low-potential circuits the relay and condenser may be omitted and the opposite sides of the local circuit containing the electromagnet $a^{52}$ may be connected to the local terminal rings $a^5$ $a^6$.

In practice the plate or base A may and preferably will be provided with suitable switches or plugs $e^{10}$, by which the line-circuits may be connected to and disconnected from the testing apparatus when desired.

The apparatus herein shown is designed to be driven by power, as from an electric motor, and to be automatically stopped; but we do not desire to limit our invention in this respect, as the circuit-controllers might be operated by hand.

The relay $b^{12}$ is preferably of the construction shown and described in our United States Patent No. 427,571, above referred to, so as to permit the testing apparatus without change to be used with circuits traversed by straight or alternating currents.

We claim—

1. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuit, means to impart to said circuit-controllers different rates of movement, and an electromagnet in said auxiliary circuit governing the operation of said means, substantially as and for the purpose specified.

2. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuits, means to impart to said circuit-controllers different rates of movement, a relay in said auxiliary circuit, a local circuit governed by said relay, and an electromagnet in said local circuit governing the operation of the means which move the said circuit-controllers, substantially as described.

3. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuit, means to impart to said circuit-controllers different rates of movement, an electromagnet in said auxiliary circuit governing the operation of said means, and an audible signal controlled in its operation by said electromagnet, substantially as described.

4. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuit, means to impart to said circuit-controllers different rates of movement, an electromagnet in said auxiliary circuit governing the operation of said means, a circuit-controller for said auxiliary circuit, and means under the control of the electromagnet to operate the circuit-controller of the auxiliary circuit, substantially as described.

5. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuit, means to impart to said circuit-controllers different rates of movement, a relay and a condenser in said auxiliary circuit, a local circuit governed by said relay, and an electromagnet in said local circuit governing the operation of the means which move the said circuit-controllers, substantially as described.

6. In a testing apparatus for electric circuits, the combination of the following instrumentalities, viz: a plurality of line-terminals to which the circuits to be tested are connected, an auxiliary circuit provided with terminals coöperating with said line-terminals, rotatable arms having different rates of movements and provided with circuit-controllers coöperating with the line-terminals and with the terminals of the auxiliary circuit, shields or guards carried by one of said arms, and an electromagnet governed by said circuit-controllers and adapted to be energized when a fault exists on the line-circuits, substantially as and for the purpose specified.

7. In a testing apparatus for electric circuits the combination of the following instrumentalities, viz: a plurality of line-terminals arranged in a circle and insulated from each other, auxiliary terminals located within and outside of the said line-terminals, rotatable circuit-controllers coöperating with said line-terminals and with said auxiliary terminals, a motor mechanism to rotate said circuit-controllers including a worm-shaft provided with a clutch mechanism, and an electromagnet to operate said clutch mechanism and controlled in its operation by the said circuit-controllers, substantially as described.

8. In a testing apparatus for electric circuits, the combination of the following instrumentalities, viz: a supporting-base provided with line-terminals arranged in a circle, and with auxiliary terminals coöperating with said line-terminals, rotatable circuit-controllers coöperating with said line and auxiliary terminals, a motor mechanism supported by said base and operating said circuit-controllers at different rates of movement, a clutch mechanism controlling the operation of said motor mechanism, an electromagnet controlling the operation of said clutch mechanism in one direction, and a brake mechanism coöperating with said motor mechanism, substantially as described.

9. In a testing apparatus for electric circuits, the combination of the following instrumentalities, viz: a supporting-base provided with line-terminals arranged in a circle, and with auxiliary terminals coöperating with said line-terminals, rotatable circuit-controllers coöperating with said line and auxiliary terminals, a motor mechanism supported by said base and operating said circuit-controllers at different rates of movement, a clutch mechanism controlling the operation of said motor mechanism, an electromagnet controlling the operation of said clutch mechanism in one direction, a circuit-controller, means to operate said circuit-controller, and a locking device for said means operated by the said electromagnet, substantially as described.

10. In a testing apparatus for electric circuits, the combination of the following instrumentalities, viz: a plurality of circuit-terminals, auxiliary terminals coöperating therewith, movable circuit-controllers having different rates of movement and coöperating with said circuit-terminals and the auxiliary terminals, a motor mechanism to move said circuit-controllers, and an electromagnet controlling the operation of said motor mechanism and energized by a fault on the circuits, substantially as and for the purpose specified.

11. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuit, means to impart to said circuit-controllers different rates of movement, and an electromagnet in said auxiliary circuit, substantially as described.

12. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuit, means to impart to said circuit-controllers different rates of movement, and an indicator under control of the said auxiliary circuit and governed in its operation by the said circuit-controllers, substantially as and for the purpose specified.

13. In a testing apparatus for electric circuits, the combination of the following instrumentalities, viz: a plurality of line-terminals to which the circuits to be tested are connected, an auxiliary circuit provided with terminals coöperating with said line-terminals, movable circuit-controllers coöperating with said line-terminals and with the terminals of said auxiliary circuit, and one of which is capable of being moved by or past the other, a shield or guard of insulating material carried by one of the said movable controllers to prevent the other movable controller making contact with the terminal with which the first-mentioned controller is in contact and an indicator under control of the said auxiliary circuit and governed in its operation by the said circuit-controllers, substantially as and for the purpose specified.

In testimony whereof we have signed our names to this specification in the presence of two subscribing witnesses.

EDWARD HEYMANN.
    FRANK W. HEYMANN.

Witnesses:
 JAS. H. CHURCHILL,
 J. MURPHY.